US012791653B2

(12) United States Patent
Namioka

(10) Patent No.: US 12,791,653 B2
(45) Date of Patent: Nov. 10, 2026

(54) PROCESSING DEVICE, PROCESSING SYSTEM, PROCESSING METHOD, AND STORAGE MEDIUM

(71) Applicant: KABUSHIKI KAISHA TOSHIBA, Tokyo (JP)

(72) Inventor: Yasuo Namioka, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 258 days.

(21) Appl. No.: 18/806,609

(22) Filed: Aug. 15, 2024

(65) Prior Publication Data

US 2024/0402282 A1 Dec. 5, 2024

Related U.S. Application Data

(63) Continuation of application No. PCT/JP2022/006715, filed on Feb. 18, 2022.

(51) Int. Cl.
*G01S 5/02* (2010.01)
*G01S 1/04* (2006.01)
(Continued)

(52) U.S. Cl.
CPC .......... *G01S 5/0244* (2020.05); *G01S 1/0428* (2019.08); *G01S 1/68* (2013.01); *G01S 5/0242* (2013.01);
(Continued)

(58) Field of Classification Search
CPC ........ G01S 5/0244; G01S 1/0428; G01S 1/68; G01S 5/0242; G01S 5/0215; G01S 5/14; G06Q 10/087; H04B 17/318
(Continued)

(56) References Cited

U.S. PATENT DOCUMENTS 10,932,221 B2 * 2/2021 Grossmann ............... G01S 1/20
2005/0250452 A1 * 11/2005 Walton ................ H04W 52/029 455/562.1

(Continued)

FOREIGN PATENT DOCUMENTS

JP 2008-282211 11/2008
JP 2008-299820 12/2008

(Continued)

OTHER PUBLICATIONS

Japanese Decision of Refusal for Japanese Application No. 2020-171968, issued Sep. 27, 2024, in three pages.

(Continued)

*Primary Examiner* — Don N Vo
(74) *Attorney, Agent, or Firm* — Knobbe, Martens, Olson & Bear, LLP

(57) ABSTRACT

According to one embodiment, a processing device is configured to acquire a reception result obtained by a receiver receiving at least a portion of signals emitted from a plurality of transmitters and determine, based on strengths of the signals, a position of the transmitter at which the receiver is present. The processing device refers to transitionable data when the receiver transitions from a first position of one of the plurality of transmitters to a second position of another of the plurality of transmitters. The processing device approves the transition in a first case in which the transition is determined to be possible based on the transitionable data. The processing device does not approve the transition during a first period in a second case in which the transition is determined to be impossible based on the transitionable data.

9 Claims, 9 Drawing Sheets

(51) Int. Cl.
*G01S 1/68* (2006.01)
*G06Q 10/087* (2023.01)
*H04B 17/318* (2015.01)

(52) U.S. Cl.
CPC ......... *G06Q 10/087* (2013.01); *H04B 17/318* (2015.01)

(58) Field of Classification Search
USPC ....................................................... 455/456.6
See application file for complete search history.

(56) References Cited

U.S. PATENT DOCUMENTS

| | | | | |
|---|---|---|---|---|
| 2011/0074635 | A1* | 3/2011 | Yeo | G01S 5/021 342/464 |
| 2011/0130152 | A1* | 6/2011 | Kim | H04W 64/00 455/456.1 |
| 2015/0280869 | A1* | 10/2015 | Sobue | H04L 1/20 375/350 |
| 2016/0359885 | A1* | 12/2016 | Guan | H04W 12/12 |
| 2016/0360418 | A1 | 12/2016 | Guan et al. | |
| 2017/0038462 | A1 | 2/2017 | Namioka et al. | |
| 2019/0297592 | A1* | 9/2019 | Lindquist | G01S 5/0236 |

FOREIGN PATENT DOCUMENTS

| | | |
|---|---|---|
| JP | 2009-210516 | 9/2009 |
| JP | 2009-264747 | 11/2009 |
| JP | 2011-096174 | 5/2011 |
| JP | 5978747 | 8/2016 |
| JP | 2016 218027 A | 12/2016 |
| JP | 2017-032546 | 2/2017 |
| JP | 2017-067745 | 4/2017 |
| JP | 2018-194379 | 12/2018 |
| JP | 2019-144047 | 8/2019 |
| JP | 2022-063618 | 4/2022 |

OTHER PUBLICATIONS

Office Action received in Japanese Application No. 2020-171968, dated Apr. 23, 2024.

* cited by examiner

| ID | TRANSITIONABLE POSITIONS | FIRST PERIOD (SECONDS) |
|---|---|---|
| $21_{11}$ | $21_{12}$, $21_{21}$ | 15 |
| $21_{12}$ | $21_{11}$, $21_{22}$, $21_{13}$ | 15 |
| $21_{13}$ | $21_{12}$, $21_{23}$, $21_{14}$ | 15 |
| $21_{14}$ | $21_{13}$, $21_{24}$ | 15 |
| $21_{21}$ | $21_{11}$, $21_{31}$ | 10 |
| $21_{22}$ | $21_{12}$, $21_{32}$ | 10 |

FIG. 5

PROCESSING DEVICE, PROCESSING SYSTEM, PROCESSING METHOD, AND STORAGE MEDIUM

CROSS-REFERENCE TO RELATED APPLICATIONS

This is a continuation application of International Patent Application PCT/JP2022/006715, filed on Feb. 18, 2022. The entire contents of which are incorporated herein by reference.

FIELD

Embodiments described herein relate generally to a processing device, a processing system, a processing method, and a storage medium.

BACKGROUND

There is technology that uses transmitters and a receiver to determine the position of the receiver. It is desirable to increase the determination accuracy of the position in such technology.

BRIEF DESCRIPTION OF THE DRAWINGS

FIG. 5 is an example of transitionable data;

DETAILED DESCRIPTION

Figure 1:
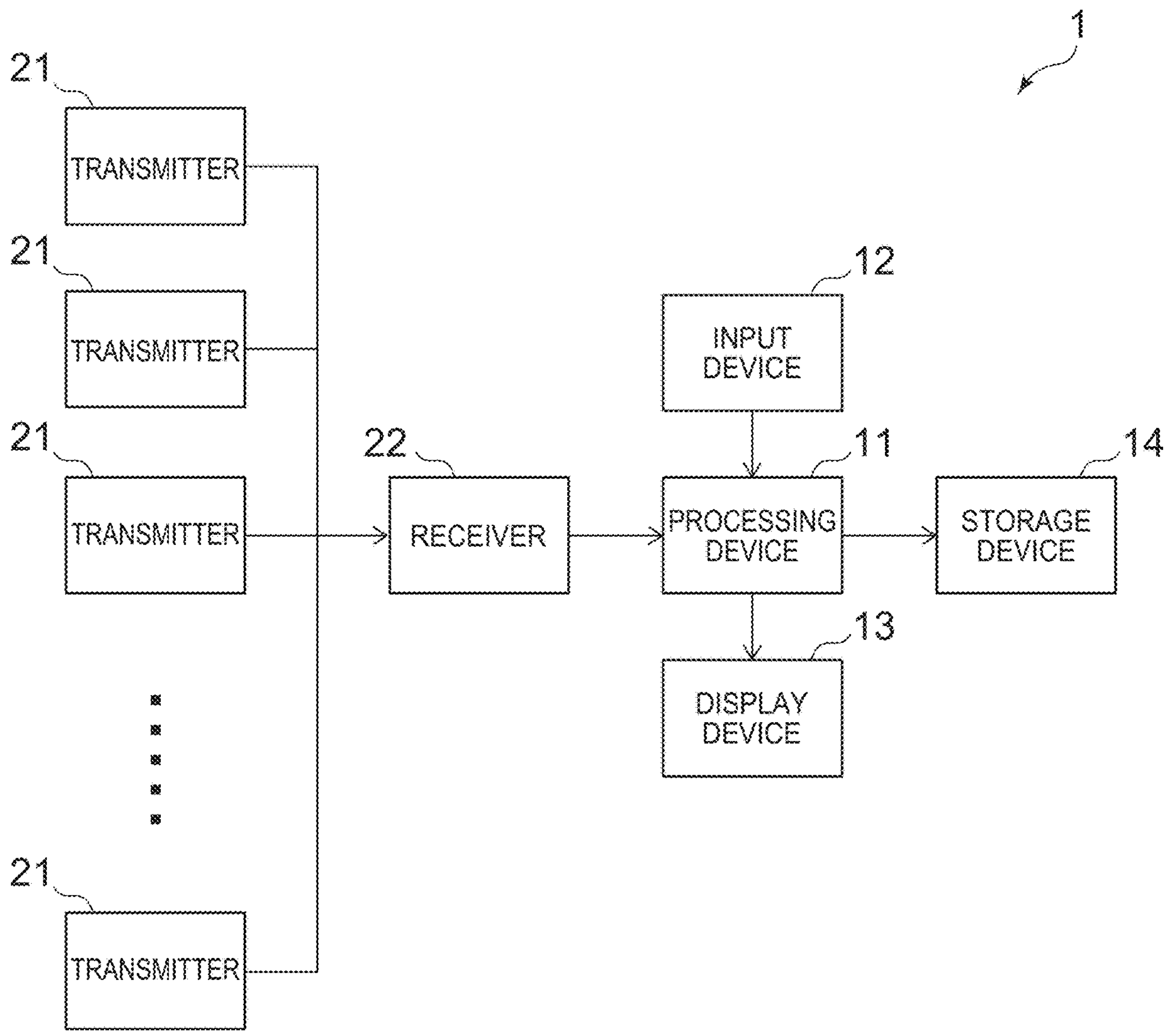
FIG. 1 is a schematic view illustrating a configuration of a processing system according to an embodiment.

According to one embodiment, a processing device is configured to acquire a reception result obtained by a receiver receiving at least a portion of signals emitted from a plurality of transmitters. The processing device is configured to determine, based on strengths of the signals, a position of the transmitter at which the receiver is present. The processing device refers to transitionable data when the receiver transitions from a first position of one of the plurality of transmitters to a second position of another of the plurality of transmitters. The transitionable data is of transitionable positions from positions of the plurality of transmitters. The processing device approves the transition in a first case in which the transition is determined to be possible based on the transitionable data. The processing device does not approve the transition during a first period in a second case in which the transition is determined to be impossible based on the transitionable data.

Various embodiments will be described hereinafter with reference to the accompanying drawings. In the specification and drawings, components similar to those described or illustrated in a drawing thereinabove are marked with like reference numerals, and a detailed description is omitted as appropriate.

FIG. 1 is a schematic view illustrating a configuration of a processing system according to an embodiment.

The processing system 1 according to the embodiment is used to automatically determine the position (location) at which a person or object to which a receiver is attached is present. According to the processing system 1, for example, the positions at which a person has dwelled, the dwell period at each position, the movement history of the person, etc., can be automatically recorded for a manufacturing site, logistics warehouse, exhibition hall, etc.

As illustrated in FIG. 1, the processing system 1 includes a processing device 11, an input device 12, a display device 13, a storage device 14, multiple transmitters 21, and a receiver 22.

The processing device 11 processes various data obtained by the processing system 1. A user uses the input device 12 to input data to the processing device 11. The display device 13 displays the data output from the processing device 11 toward the user. The storage device 14 stores various data.

Each transmitter 21 emits a signal. The signal includes identification information of the transmitter 21. The transmitter 21 emits the signal at a prescribed interval. The signal that is emitted from the transmitter 21 may be directional or nondirectional. For example, a parabolic reflector facing a specific direction is mounted to the transmitter 21. A radio wave absorber that covers directions other than the specific direction may be mounted to the transmitter 21.

The receiver 22 receives a signal. The receiver 22 is attached to a person or an object to be able to receive at least a portion of the signals emitted from the multiple transmitters 21. The receiver 22 transmits the reception result to the processing device 11.

The processing device 11 acquires the identification information of the transmitter 21 and the strength of the signal from the reception result. The processing device 11 also determines the reception time. The strength of the signal correlates to the distance between the receiver 22 and the transmitter 21 emitting the signal. The strength increases as the distance decreases. The processing device 11 determines the position of the transmitter 21 at which the receiver 22 is present based on the strength of the signal. "The position of the transmitter 21" includes not only the point at which the transmitter 21 is located, but also the area around the transmitter 21.

The processing device 11 determines the transmitter 21 most proximate to the receiver 22. The processing device 11 determines that the receiver 22 is present at the position at which the transmitter 21 is located. A threshold may be set for each transmitter 21. The processing device 11 determines that the receiver 22 is present at the position at which the transmitter 21 is located when the distance is less than the threshold. The processing device 11 determines the position at which the receiver 22 is present each time the reception result is acquired.

For example, the receiver 22 is determined to be present at a position at which one transmitter 21 is located. Then, the receiver 22 is determined to be present at a position at which another transmitter 21 is located. In such a case, it is determined that the receiver 22 has transitioned from the position of the one transmitter 21 to the position of the other transmitter 21. Herein, the transition origin position also is called a first position. The transition destination position also is called a second position.

The storage device 14 stores transitionable data of transitionable positions from the positions of the transmitters 21. The processing device 11 refers to the transitionable data when a transition occurs. The processing device 11 determines whether or not the transition from the first position to the second position is set to be possible in the transitionable data.

When the transition is determined to be possible based on the transitionable data (a first case), the processing device 11 approves the transition. The receiver 22 is determined to be present at the second position. When the transition is determined to be impossible based on the transitionable data (a second case), the processing device 11 does not approve the transition during a first period. The first period is preset according to the distance between the transmitters 21, the interval at which the signal is emitted, the movement velocity of the receiver 22, etc.

In the second case, the processing device 11 approves the transition when the dwell of the receiver 22 at the second position is not less than the first period. The processing device 11 determines that the receiver 22 is present at the second position. Also, the receiver 22 is determined to have continuously dwelled at the second position during the first period. "Dwell" refers to when the receiver 22 is continuously determined multiple times to be present at the position of one transmitter 21.

In the second case, the processing device 11 does not approve the transition when the receiver 22 dwells at the second position for less than the first period. In other words, the transition is not approved when the receiver 22 is determined to be present at another position before the first period has elapsed from when the receiver 22 is initially determined to be present at the second position. For example, the receiver 22 is determined to have dwelled at the first position during the period in which the receiver 22 had been determined to be present at the second position.

Figure 2:
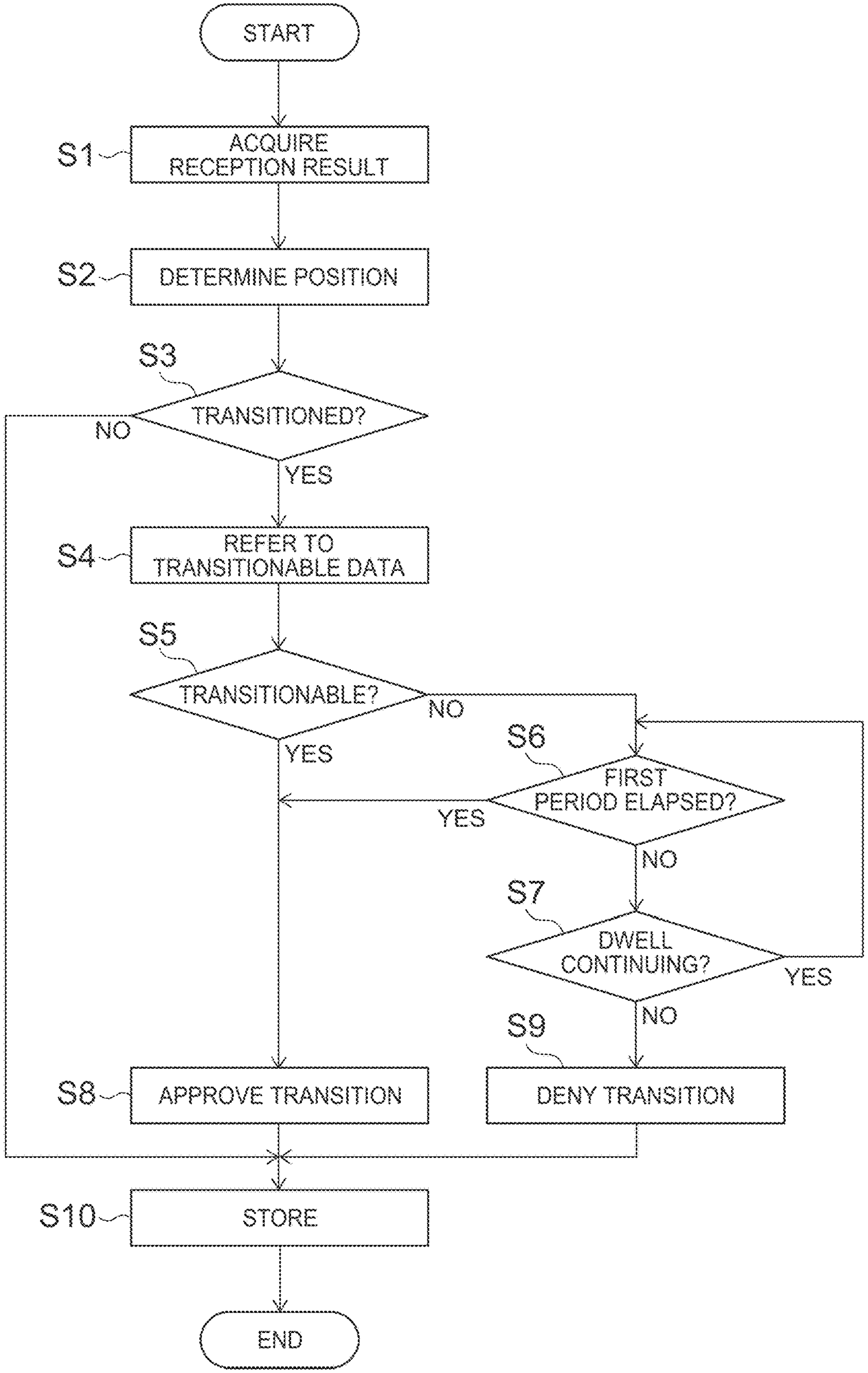
FIG. 2 is a flowchart illustrating processing according to the processing system according to the embodiment.

FIG. 2 is a flowchart illustrating processing according to the processing system according to the embodiment.

The processing device 11 acquires a reception result from the receiver 22 (step S1). Based on the reception result, the processing device 11 determines the position of the receiver 22 (step S2). The processing device 11 determines whether or not the position of the receiver 22 has transitioned (step S3). When a transition has occurred, the processing device 11 refers to the transitionable data (step S4). The processing device 11 determines whether or not the determined transition is possible based on the transitionable data (step S5).

When the transition is impossible, the processing device 11 determines whether or not the receiver 22 has dwelled at the determined position for the first period (step S6). When the dwell period is less than the first period, the processing device 11 determines whether or not the dwell is being continued (step S7). Specifically, in step S7, the processing device 11 performs processing similar to steps S1 and S2. The processing device 11 determines whether or not the receiver 22 is present at the same position as the position determined directly before. When the receiver 22 is determined to be present at the same position as the directly-previous position, the processing device 11 determines that the dwell is being continued.

When the dwell is being continued, step S6 is performed again. When the transition is determined to be possible in step S5, or when the dwell period is determined to be not less than the first period in step S6, the processing device 11 approves the transition (step S8). When it is determined that the dwell is not being continued in step S7, the processing device 11 denies (does not approve) the transition (step S9).

After it is determined that there is no transition in step S3, after step S8 is performed, or after step S9 is performed, the processing device 11 stores the position and time of the receiver 22 in the storage device 14 (step S10). When the transition occurs, data of whether or not the transition is possible based on the transitionable data is stored in addition to the position.

Figure 3:
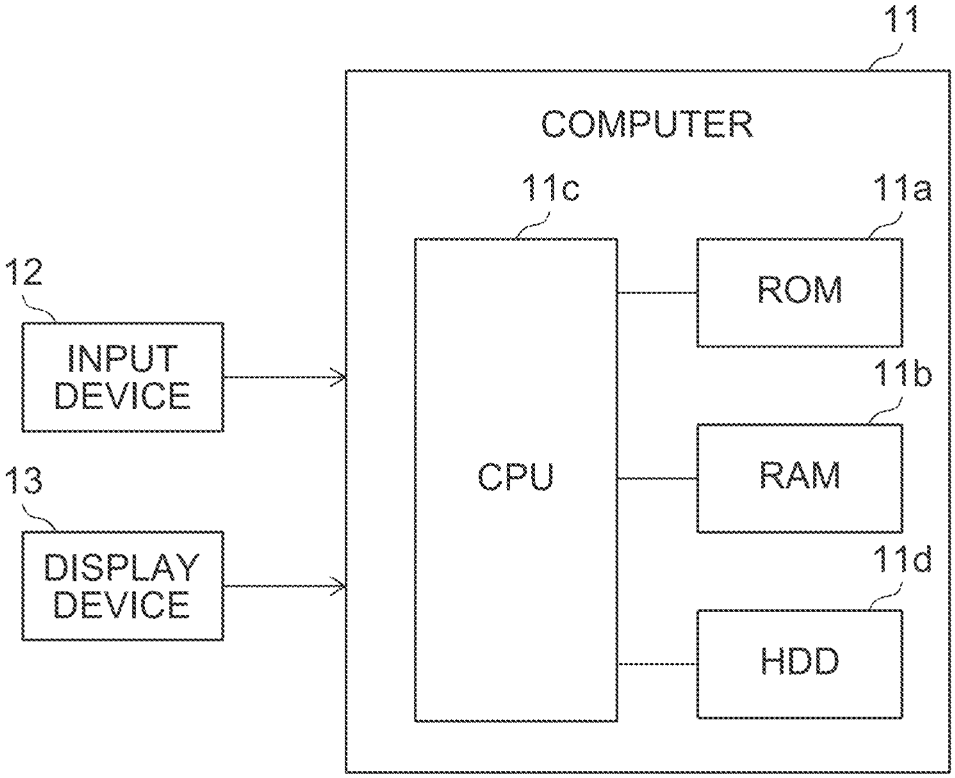
FIG. 3 is a schematic view illustrating a hardware configuration.

FIG. 3 is a schematic view illustrating a hardware configuration.

The processing device 11 is, for example, a computer and includes read only memory (ROM) 11*a*, random access memory (RAM) 11*b*, a central processing unit (CPU) 11*c*, and a hard disk drive (HDD) 11*d*.

The ROM 11*a* stores programs controlling operations of the computer. Programs necessary for causing the computer to realize the processing described above are stored in the ROM 11*a*. The RAM 11*b* functions as a memory region into which the programs stored in the ROM 11*a* are loaded. The CPU 11*c* includes a processing circuit. The CPU 11*c* reads control programs stored in the ROM 11*a*, and controls the operations of the computer according to the control programs. The CPU 11*c* loads various data obtained by the operations of the computer into the RAM 11*b*. The HDD 11*d* stores data necessary for reading and/or data obtained in the reading process.

For example, the HDD 11*d* functions as the storage device 14 illustrated in FIG. 1. Or, the storage device 14 may be provided separately from the HDD 11*d*, and may include at least one of a HDD, a solid state drive (SSD), or a network-attached hard disk (NAS). The processing and functions of the processing device 11 may be realized by collaboration between more computers.

The input device 12 includes at least one of a mouse, a keyboard, or a touchpad. The display device 13 includes at least one of a monitor or a projector. A device such as a touch panel that functions as both the input device 12 and the display device 13 may be used.

The transmitter 21 is a beacon. The configuration of the receiver 22 is arbitrary as long as the receiver 22 can receive the signal emitted from the beacon. For example, a smart device such as a smartphone, a tablet, or the like receives the signal by being connected with the transmitter 21 by a common wireless communication standard such as Bluetooth (registered trademark), etc.

The smart device can be used as the processing device 11, the input device 12, the display device 13, the storage device 14, and the receiver 22. The storage device 14 may be provided separately from the smart device, and may be connected with the smart device by communicating. The function as the processing device 11 may be provided by a server on a cloud connected with the smart device. The monitor of a terminal device for a manager located separately from the smart device may be used as the display device 13.

The transmitter 21 may be a radio frequency identifier (RFID) tag emitting a signal. In such a case, the receiver 22 is a RFID reader.

Advantages of the embodiment will now be described.

There are cases where the strength of the signal received by the receiver 22 temporarily changes to become large. For example, there are cases where the transmitter 21 temporarily emits a signal that is stronger than normal. In such a case, the distance between the receiver 22 and the transmitter 21 that emitted the strong signal is calculated to be less than the actual distance. As a result, there is a possibility that the receiver 22 may be erroneously determined to be present at the position of the transmitter 21. As a result, for example, the movement of the person or object to which the receiver 22 is attached can no longer be accurately recorded.

For this problem, the processing device 11 refers to the transitionable data when a transition occurs. It is determined whether or not the transition is possible based on the transitionable data. The processing device 11 approves the transition only when the transition is determined to be possible. By using the transitionable data, a false determination of the position of the receiver 22 due to temporary fluctuation of the signal strength can be suppressed. The determination accuracy of the position of the receiver 22 can be increased.

There are cases where the receiver 22 is actually present at the determined position, even when the transition is determined to be impossible based on the transitionable data. For example, the receiver 22 may transition to the position of a distant transmitter 21 when the receiver 22 temporarily cannot receive the signals, etc. Therefore, the processing device 11 does not approve the transition during the preset first period. In other words, the processing device 11 approves the transition when the receiver 22 is continuously present at the determined position for a period that is not less than the first period. By using the first period, the determination can be prevented from being treated as an error even though the receiver 22 is actually present at the determined position. In other words, by using the first period, the accuracy of the determination can be further increased.

The transitions that are determined to be possible based on the transitionable data can be finalized more quickly by approving regardless of the first period. For example, by finalizing the transition quickly after a transition has occurred, the transition from the position to another position can be accurately tracked.

When a transition occurs, the processing device 11 may associate the determination result of the transition with data of whether or not the transition is set to be possible in the transitionable data. For example, first data is associated with the determination result of the transition when the transition is approved even though the transition is set to be impossible in the transitionable data. Second data is associated with the determination result of the transition when the transition is approved because the transition is set to be possible in the transitionable data. The first data indicates that the transition is set to be impossible (is not set to be possible) in the transitionable data. The second data indicates that the transition is set to be possible in the transitionable data. By the association of the first data or the second data, the user subsequently can easily ascertain whether or not the transition is set to be possible in the transitionable data when checking the position and transition history of the receiver 22.

The processing system 1 according to the embodiment will now be described with reference to specific examples.

Figure 4:
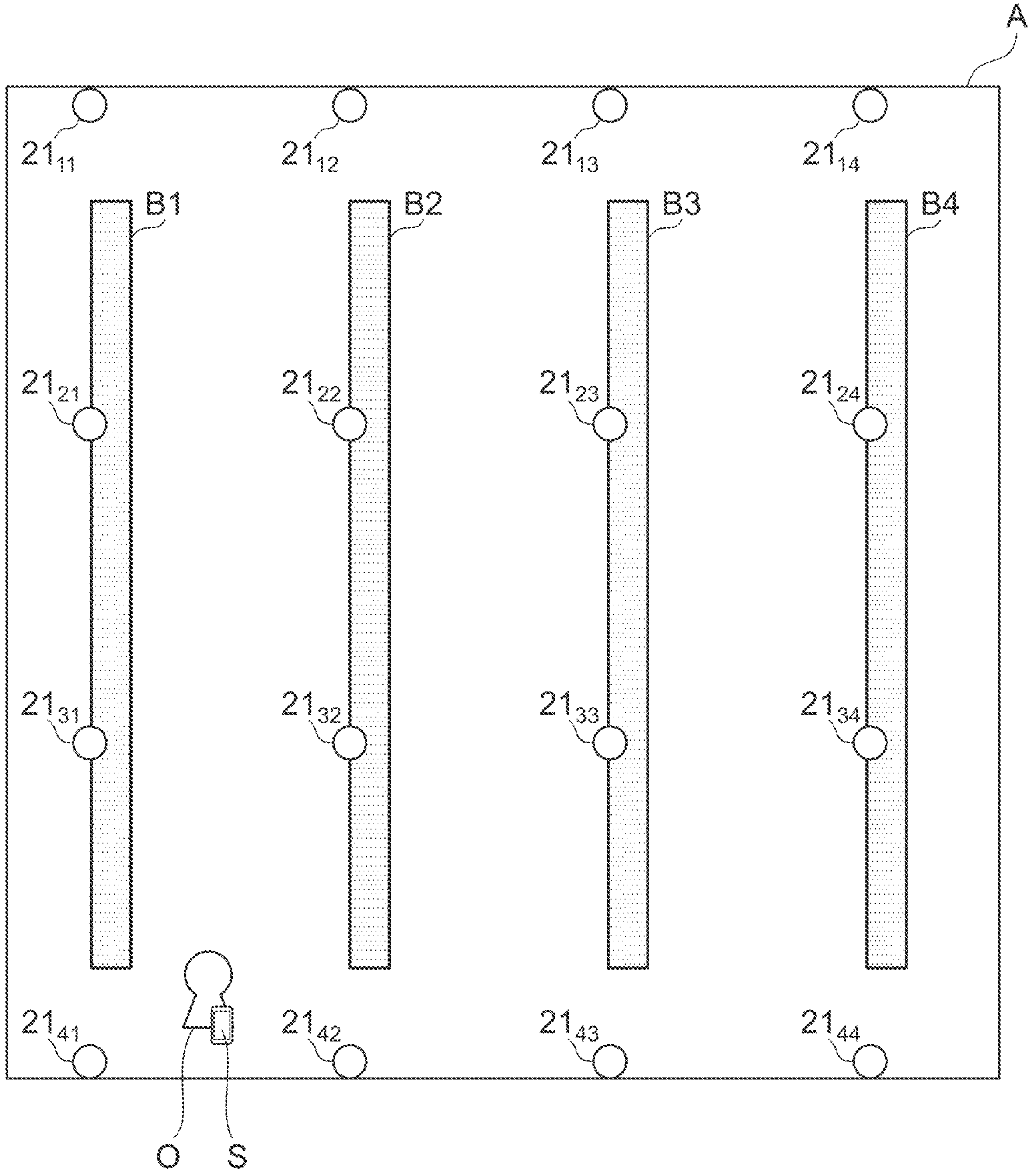
FIG. 4 is a schematic view illustrating an application example of the processing system according to the embodiment.

FIG. 4 is a schematic view illustrating an application example of the processing system according to the embodiment.

FIG. 4 illustrates a warehouse A. Multiple shelves B1 to B4 and multiple transmitters 2111 to 2144 are located inside the warehouse A. A worker O works inside the warehouse while carrying a smart device S. The smart device S functions as the input device 12, the display device 13, and the receiver 22 illustrated in FIG. 1. The functions of the processing device 11 and the storage device 14 are provided by a server connected with the smart device.

FIG. 5 is an example of transitionable data.

For example, as illustrated in FIG. 5, the transitionable data is stored as a list. The transitionable data includes the ID of each transmitter 21, transitionable positions from the position of each transmitter 21, and the first period. The transitionable positions are represented by the IDs of the transmitters 21.

In the example of FIG. 5, the positions of the transmitters 21 that are adjacent to each other are set to be transitionable. Also, even when positions of transmitters 21 are adjacent in space, the positions are not set to be transitionable if any obstacle (shelf) is present between the transmitters 21.

The first period may be set to be a common value among the transmitters 21. The first periods that are set for the transmitters 21 may be different from each other.

FIGS. 6, 7A, 7B, 8A, and 8B are enlarged schematic views of a portion of FIG. 4.

Figure 6:
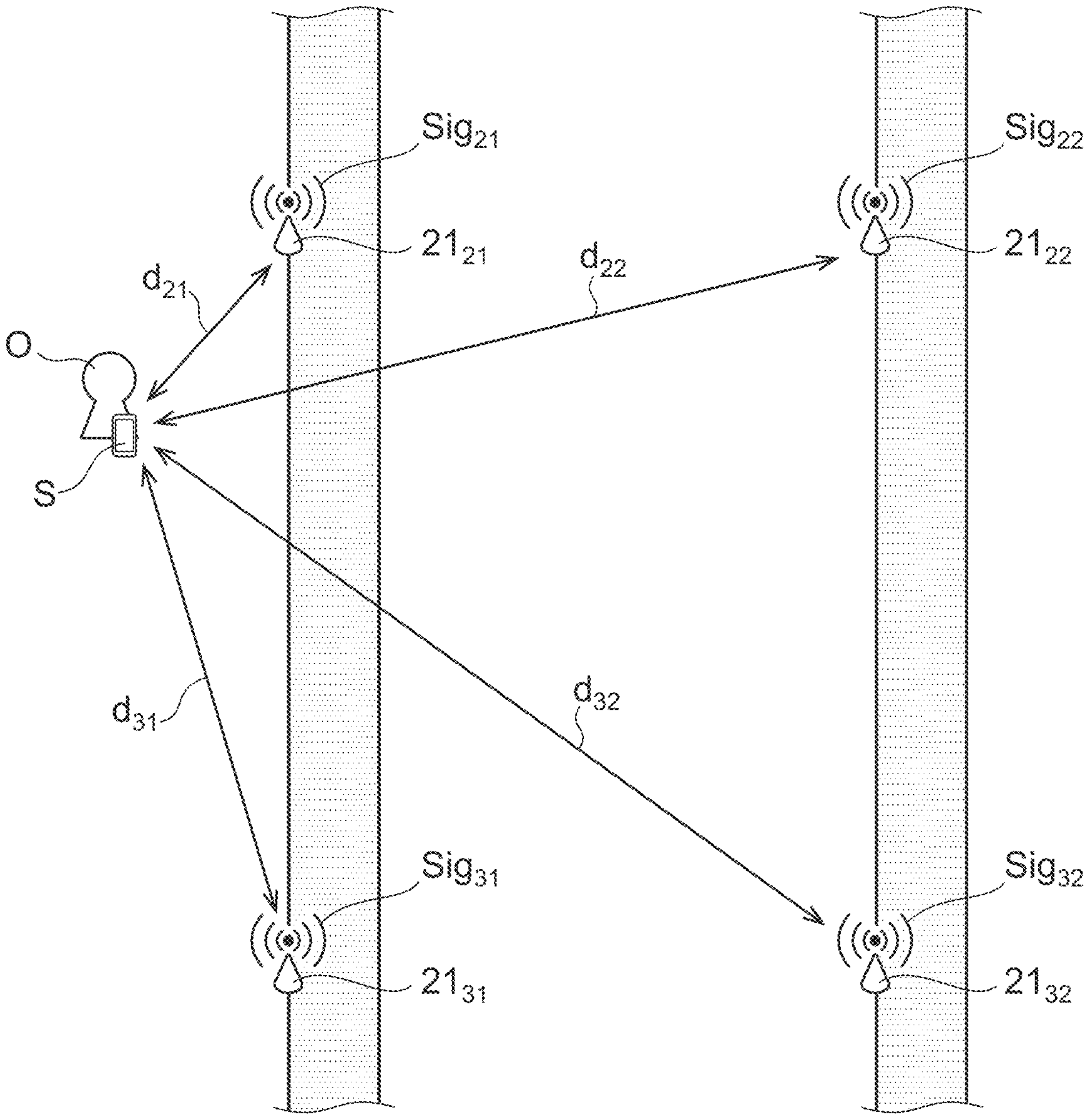
FIG. 6 is an enlarged schematic view of a portion of FIG. 4.

In FIG. 6, the transmitters $\mathbf{21}_{21}$, $\mathbf{21}_{22}$, $\mathbf{21}_{31}$, and $\mathbf{21}_{32}$ emit signals $Sig_{21}$, $Sig_{22}$, $Sig_{31}$, and $Sig_{32}$.

The smart device S, i.e., the receiver 22, receives the signals $Sig_{21}$, $Sig_{22}$, $Sig_{31}$, and $Sig_{32}$. Based on the strengths of the signals $Sig_{21}$, $Sig_{22}$, $Sig_{31}$, and $Sig_{32}$, the processing device 11 calculates distances $d_{21}$, $d_{22}$, $d_{31}$, and $d_{32}$ respectively between the receiver 22 and the transmitters $\mathbf{21}_{21}$, $\mathbf{21}_{22}$, $\mathbf{21}_{31}$, and $\mathbf{21}_{32}$. In the example of FIG. 6, the distance $d_{21}$ is shortest. The processing device 11 determines that the receiver 22 is present at the position of the transmitter $\mathbf{21}_{21}$.

Figure 7A:
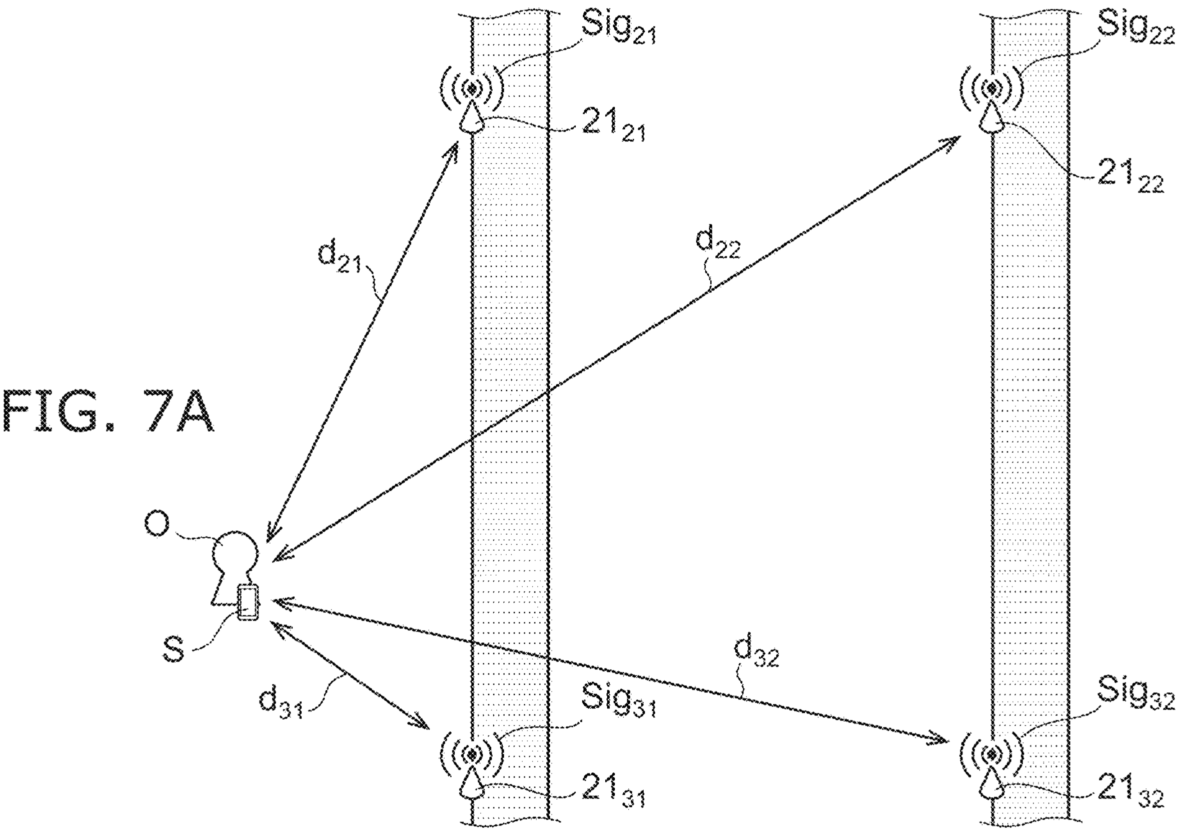
FIGS. 7A and 7B are enlarged schematic views of the portion of FIG. 4.

For example, after the state illustrated in FIG. 6, the worker O moves proximate to the transmitter $\mathbf{21}_{31}$ as illustrated in FIG. 7A. The processing device 11 compares the distances $d_{21}$, $d_{22}$, $d_{31}$, and $d_{32}$ and determines that the receiver 22 is present at the position of the transmitter $\mathbf{21}_{31}$. The processing device 11 determines that the position of the receiver 22 transitioned from the position of the transmitter $\mathbf{21}_{21}$ to the position of the transmitter $\mathbf{21}_{31}$. The processing device 11 refers to the transitionable data and determines whether or not the transition from the position of the transmitter $\mathbf{21}_{21}$ to the position of the transmitter $\mathbf{21}_{31}$ is possible. The transition is set to be possible in the transitionable data illustrated in FIG. 5. The processing device 11 approves the transition before the first period has elapsed.

Figure 7B:
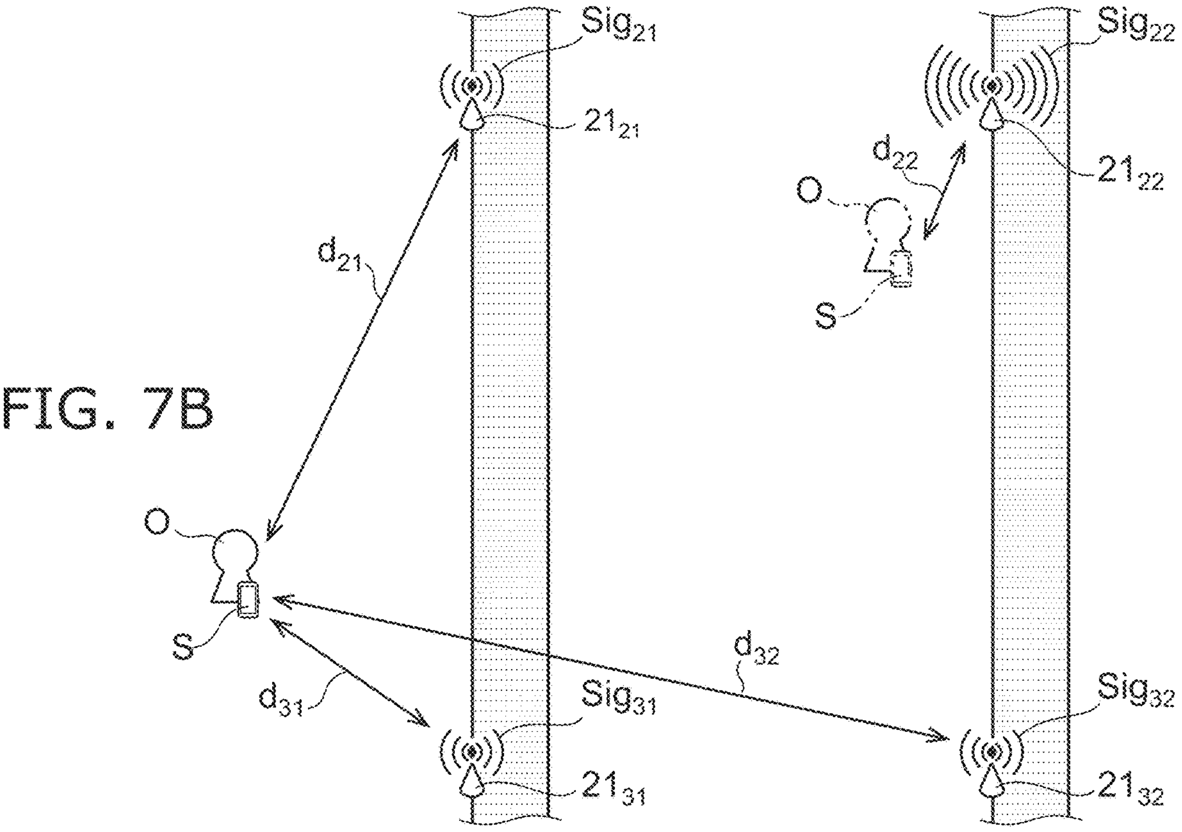

There are cases where a portion of the transmitters 21 temporarily emits a stronger signal than normal. As an example, the strength of the signal $Sig_{22}$ is temporarily increased in the state in which the worker O is proximate to the transmitter $\mathbf{21}_{31}$. As illustrated in FIG. 7B, the distance $d_{22}$ is calculated to be less than the actual distance due to the increase of the strength of the signal $Sig_{22}$. As a result, the distance $d_{22}$ is determined to be shortest. The receiver 22 is determined to be present at the position of the transmitter $\mathbf{21}_{22}$ even though the receiver 22 actually is present at the position of the transmitter $\mathbf{21}_{31}$.

In such a case, the processing device 11 determines that the position of the receiver 22 transitioned from the position of the transmitter $\mathbf{21}_{31}$ to the position of the transmitter $\mathbf{21}_{22}$. The processing device 11 refers to the transitionable data and determines whether or not the transition from the position of the transmitter $\mathbf{21}_{31}$ to the position of the transmitter $\mathbf{21}_{22}$ is possible. The transition is not set to be possible in the transitionable data illustrated in FIG. 5. The processing device 11 does not approve the transition for 15 seconds, which is the first period.

In the case of the false determination due to the temporary strength increase of the signal $Sig_{22}$, the strength of the signal $Sig_{22}$ returns to the normal value before the first period has elapsed. As a result, the receiver 22 is determined to be present at the position of the transmitter $\mathbf{21}_{31}$. For example, the processing device 11 determines that the receiver 22 dwelled at the position of the transmitter $21_{31}$ for the period that the receiver 22 had been determined to be present at the position of the transmitter $21_{22}$. As a result, a period in which the dwell position of the receiver 22 is unknown can be avoided.

On the other hand, there are cases where the receiver 22 temporarily does not receive a signal. For example, the receiver 22 temporarily cannot receive a signal when the signal is shielded or when the connection between the transmitter 21 and the receiver 22 is broken. Accordingly, there is a possibility that the receiver 22 actually transitioned to the position of the transmitter $21_{22}$, and the signal strength increase is not temporary. In such a case, the receiver 22 is repeatedly determined to be present at the position of the transmitter $21_{22}$. The receiver 22 is determined to dwell at the position of the transmitter $21_{22}$ for a period that is not less than the first period. The processing device 11 approves the transition from the position of the transmitter $21_{31}$ to the position of the transmitter $21_{22}$. For example, the processing device 11 determines that the receiver 22 was present at the position of the transmitter $21_{22}$ during the first period.

Figure 8A:
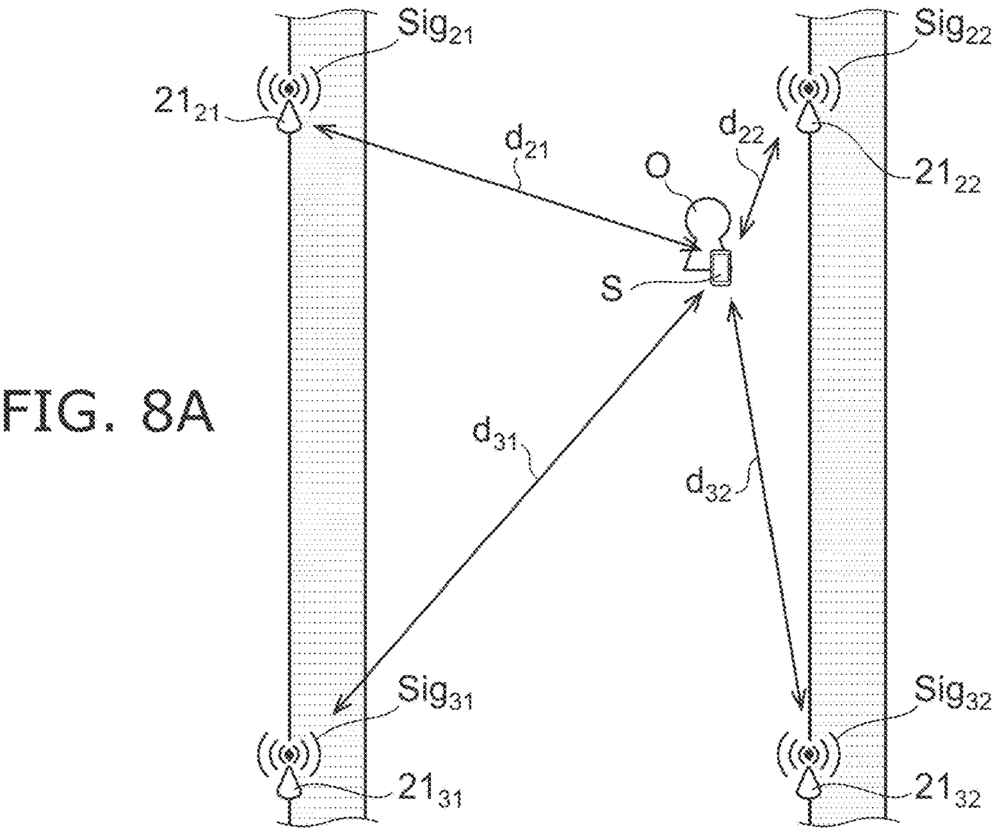
FIGS. 8A and 8B are enlarged schematic views of the portion of FIG. 4.
Figure 8B:
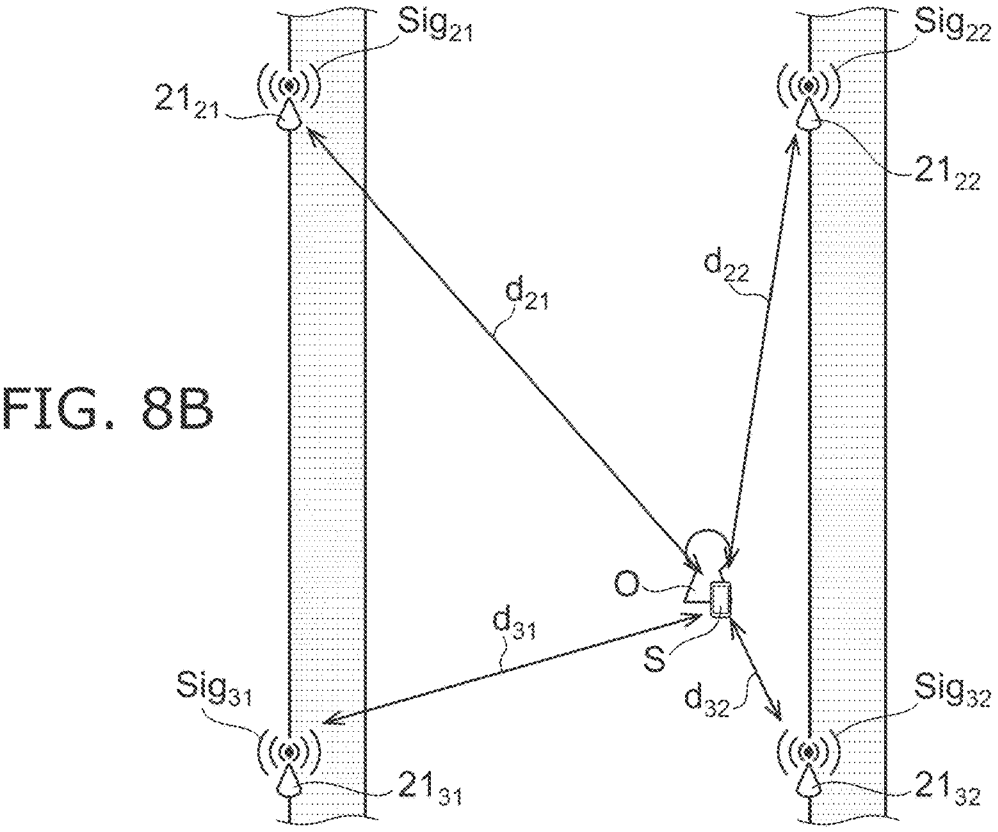

As another example, after the state illustrated in FIG. 6, the worker O moves proximate to the transmitter $21_{22}$ as illustrated in FIG. 8A. Then, the worker O moves proximate to the transmitter $21_{32}$ as illustrated in FIG. 8B. If the signal is not correctly received while the worker O moves from the transmitter $21_{21}$ to the transmitter $21_{22}$, the receiver 22 is determined to have transitioned from the position of the transmitter $21_{21}$ to the position of the transmitter $21_{22}$. The transition is not approved during the first period. When the worker O moves proximate to the transmitter $21_{32}$ before the first period has elapsed, the transition to the transmitter $21_{22}$ is not approved. The receiver 22 is determined to have transitioned from the position of the transmitter $21_{21}$ to the position of the transmitter $21_{32}$.

When the first period has elapsed from when the receiver 22 dwells at the position of the transmitter $21_{32}$, the processing device 11 approves the transition from the position of the transmitter $21_{21}$ to the position of the transmitter $21_{32}$. At this time, the processing device 11 may refer to the previous position history of the receiver 22. According to the history, the transition was not approved, but the receiver 22 was determined to be present at the position of the transmitter $21_{22}$. The processing device 11 refers to the transitionable data and determines whether or not a transition is possible from the position of the transmitter $21_{32}$ to the position of the transmitter $21_{22}$. Or, the processing device 11 may determine whether or not a transition is possible from the position of the transmitter $21_{22}$ to the position of the transmitter $21_{32}$. When the transition is possible, the processing device 11 may determine that receiver 22 was present at the position of the transmitter $21_{22}$ during the period from when the transition to the position of the transmitter $21_{22}$ was determined until the transition to the position of the transmitter $21_{32}$ was determined.

According to the embodiment, the position of the worker O inside the warehouse A can be determined with higher accuracy.

Specific examples of a method for calculating the distance between the transmitter 21 and the receiver 22, a method for calculating the dwell period, an association of related data, and an output from the processing device 11 will now be described.

Distance

The processing device 11 calculates a distance d between the receiver 22 and one transmitter 21 for each of x signals received before a time $t_0$. The processing device 11 sets a reference time $st_0$ based on the time $t_0$. The processing device 11 uses the average of the multiple distances d as the distance $d(t_0)$ between the transmitter 21 and the receiver 22 at the reference time $st_0$. By using the average, the effects of temporary fluctuation of the signal strength, disturbance to the signal, etc., can be suppressed, and the determination accuracy of the position of the receiver 22 can be increased. The processing device 11 calculates the distance $d(t_0)$ described above for each transmitter 21.

The processing device 11 compares the multiple distances $d(t_0)$ and selects the shortest distance $d(t_0)$. The processing device 11 determines that the receiver 22 is present, at the time to, at the position of the transmitter 21 for which the shortest distance $d(t_0)$ is obtained.

Multiple thresholds may be set respectively for the multiple transmitters 21. For example, the multiple thresholds are different from each other. The thresholds are set according to the distances between the adjacent transmitters 21. The processing device 11 compares the multiple distances $d(t_0)$ respectively to the multiple thresholds. The processing device 11 selects the shortest distance $d(t_0)$ from the distances $d(t_0)$ that are less than the thresholds.

The processing device 11 similarly calculates the distance d(t) at other multiple times. In other words, the processing device 11 sets the reference times $st_1, st_2, \ldots, st_i$ respectively at times $t_1, t_2, \ldots, t_i$ after the time $t_0$. The processing device 11 calculates the distances $d(t_1), d(t_2), \ldots, d(t_i)$ respectively between the receiver 22 and the transmitters 21 at each reference time. Based on the calculated distances, the processing device 11 determines the transmitter 21 where the receiver 22 is present at each of the times $t_1, t_2, \ldots, t_i$.

Dwell Period

When the receiver 22 is determined to be continuously present at the position of one transmitter 21, the processing device 11 determines that the receiver 22 dwells at the position. The processing device 11 calculates, as the dwell period, the period from when the receiver 22 is initially determined to be present at the position of the one transmitter 21 until the receiver 22 is determined to be present at the position of another transmitter 21.

Association

The storage device 14 may store data related to the positions of the receiver 22. For example, the storage device 14 may store related data for the positions of the receiver 22 such as the work to be performed, tools to be used, articles to be worked on, etc. The processing device 11 refers to the related data after determining the position of the receiver 22. The processing device 11 associates the related data related to the position of the receiver 22 with the determination result of the position. The processing device 11 may output the associated related data when outputting the determination result of the position at multiple times. As a result, the user can easily check the data related to each position.

Output

Figure 9:
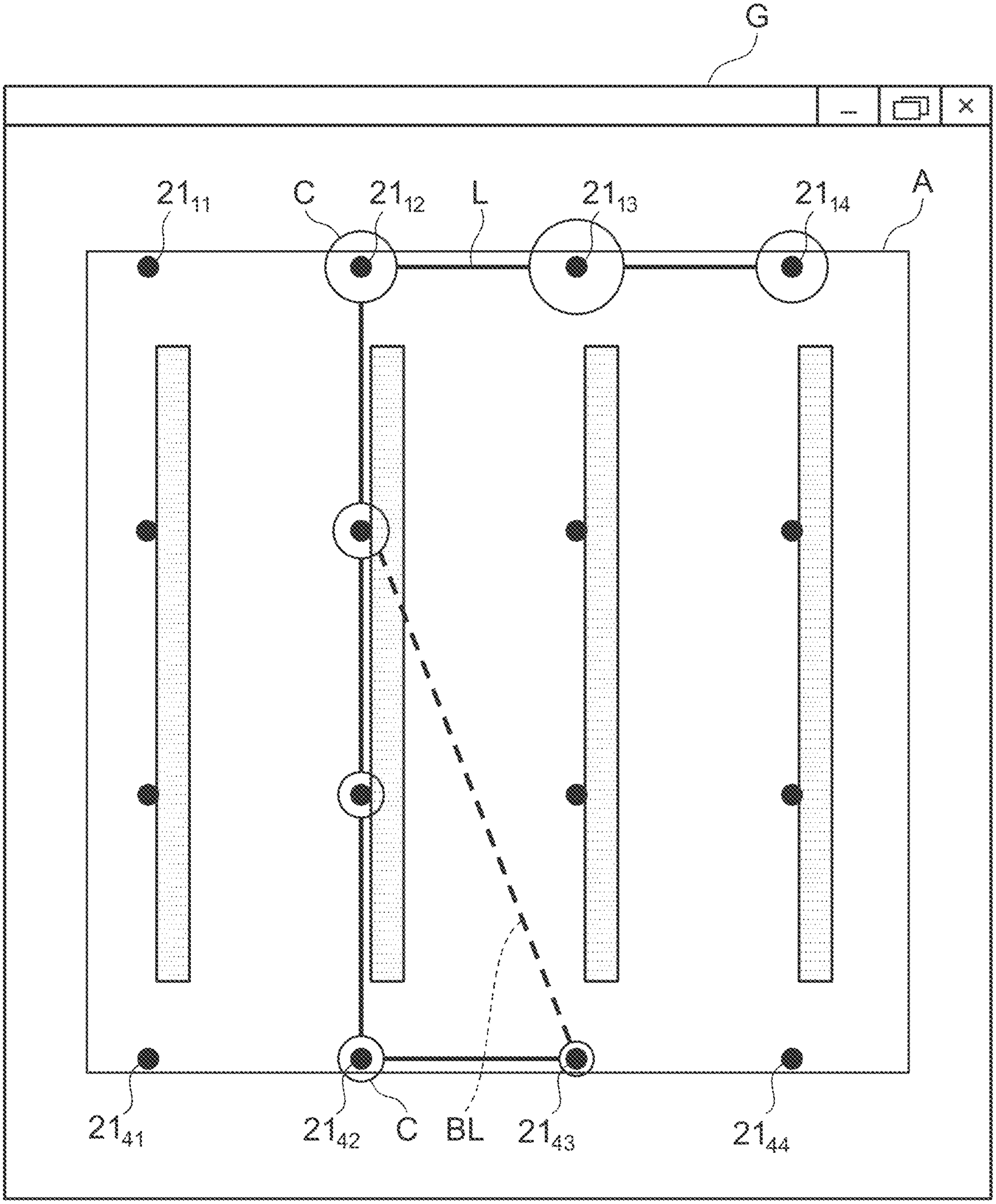
FIG. 9 is a schematic view illustrating an output example of the processing device according to the embodiment.

FIG. 9 is a schematic view illustrating an output example of the processing device according to the embodiment.

For example, the processing device 11 causes the display device 13 to display an image G illustrated in FIG. 9 based on the determination results of the positions of the receiver 22 at multiple times. The image G shows the warehouse A, the positions of the transmitters 21, circles C, lines L, and a broken line BL. The transmitters 21 that are surrounded with the circles C indicate that the receiver 22 was determined to be present at the positions of the transmitters 21. A larger circle C indicates that the total dwell period of the receiver 22 at the position was long.

The line L illustrates the transition of the receiver 22 determined to be possible based on the transitionable data. In other words, the line L illustrates the transition associated with the second data. The broken line BL illustrates the transition of the receiver 22 determined to be impossible based on the transitionable data. In other words, the broken line BL illustrates the transition associated with the first data.

By displaying the position history of the receiver 22, the user can easily ascertain the path along which the worker O moved. By displaying the length of the dwell period at each position, it can be easily ascertained at which positions and for how long a period the worker O dwelled. Because the transitions determined to be possible and the transitions determined to be impossible based on the transitionable data are discriminated in the display, the user can easily ascertain the reliability of each transition.

An example is described above in which the worker O carries the receiver 22. The receiver 22 is not limited to the example; the receiver 22 may be mounted to a moving object. In such a case, it can be automatically determined at which positions and for how long the moving object dwelled at each position.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another recording medium.

For example, the data that is recorded in the recording medium can be read by a computer (or an embedded system). The recording format (the storage format) of the recording medium is arbitrary. For example, the computer reads a program from the recording medium and causes a CPU to execute the instructions recited in the program based on the program. In the computer, the acquisition (or the reading) of the program may be performed via a network.

According to the processing system 1, the processing device 11, or the processing method described above, the determination accuracy of the position of the receiver can be increased. Similarly, according to a program causing the processing device 11 to perform the processing described above, the determination accuracy of the position of the receiver can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A processing device, configured to:

acquire a reception result obtained by a receiver receiving at least a portion of signals emitted from a plurality of transmitters; and determine, based on strengths of the signals, a position of the transmitter at which the receiver is present, the processing device referring to transitionable data when the receiver transitions from a first position of one of the plurality of transmitters to a second position of another of the plurality of transmitters, the transitionable data being of transitionable positions from positions of the plurality of transmitters, the processing device approving the transition in a first case in which the transition is determined to be possible based on the transitionable data, the processing device not approving the transition during a first period in a second case in which the transition is determined to be impossible based on the transitionable data.

2. The processing device according to claim 1, wherein in the second case, the processing device approves the transition when the receiver dwells at the second position for not less than the first period, and the processing device does not approve the transition when the receiver dwells at the second position for less than the first period.

3. The processing device according to claim 2, wherein when the transition is approved in the second case, the processing device associates first data and the transition and stores the first data, and the first data indicates that the transition is impossible in the transitionable data.

4. The processing device according to claim 1, wherein based on a determination result of the position at which the receiver is present, the processing device calculates dwell periods of the receiver at the positions of the plurality of transmitters.

5. The processing device according to claim 4, wherein when the transition is not approved in the second case, the processing device determines that the receiver dwelled at the first position during a period in which the receiver had been determined to dwell at the second position.

6. The processing device according to claim 1, wherein the processing device outputs an image of a plurality of the transitions related to the receiver, and the processing device displays the image so that, in the image, a portion of the plurality of transitions determined to be possible based on the transitionable data and another portion of the plurality of transitions determined to be impossible based on the transitionable data are discriminated.

7. A processing system, comprising:

the processing device according to claim 1;

the plurality of transmitters; and the receiver.

8. A processing method, comprising:

acquiring a reception result obtained by a receiver receiving at least a portion of signals emitted from a plurality of transmitters;

determining, based on strengths of the signals, a position of the transmitter at which the receiver is present;

referring to transitionable data when the receiver transitions from a first position of one of the plurality of transmitters to a second position of another of the plurality of transmitters, the transitionable data being of transitionable positions from positions of the plurality of transmitters;

approving the transition in a first case in which the transition is determined to be possible based on the transitionable data; and not approving the transition during a first period in a second case in which the transition is determined to be impossible based on the transitionable data.

9. A non-transitory computer-readable storage medium configured to store a program, the program, when executed by a computer, causing the computer to:

acquire a reception result obtained by a receiver receiving at least a portion of signals emitted from a plurality of transmitters;

determine, based on strengths of the signals, a position of the transmitter at which the receiver is present;

refer to transitionable data when the receiver transitions from a first position of one of the plurality of transmitters to a second position of another of the plurality of transmitters, the transitionable data being of transitionable positions from positions of the plurality of transmitters;

approve the transition in a first case in which the transition is determined to be possible based on the transitionable data; and not approve the transition during a first period in a second case in which the transition is determined to be impossible based on the transitionable data.

* * * * *